United States Patent [19]

Peasley

[11] 4,059,943
[45] Nov. 29, 1977

[54] HARVESTER APPARATUS

[76] Inventor: Gerald J. Peasley, R.R. No. 1, Eilers Road, Montaque, Mich. 49437

[21] Appl. No.: 581,632

[22] Filed: May 28, 1975

[51] Int. Cl.² ............................................. A01D 45/00
[52] U.S. Cl. ..................................... 56/327 A; 171/58
[58] Field of Search .................... 56/327 A, 328 R; 171/39, 58, 62, 26–40, 50

[56] References Cited

U.S. PATENT DOCUMENTS

| | | | |
|---|---|---|---|
| 1,207,889 | 12/1916 | Fletcher | 171/39 |
| 1,401,413 | 12/1921 | Knowles | 171/39 |
| 2,791,957 | 5/1957 | Kepner | 56/327 A |
| 3,066,469 | 12/1962 | Chatagnier | 56/327 A |
| 3,176,456 | 4/1965 | Franzen | 56/327 A |
| 3,412,540 | 11/1968 | Lawson | 56/327 A |
| 3,452,525 | 7/1969 | Francis | 56/327 A |
| 3,475,889 | 11/1969 | Overstreet et al. | 56/328 R |
| 3,548,950 | 12/1970 | Phelan et al. | 171/39 |
| 3,591,948 | 7/1971 | Brumbaugh | 56/328 R |
| 3,736,730 | 6/1973 | Dobson | 56/63 |
| 3,828,534 | 8/1974 | McRobert | 56/328 R |
| 3,855,764 | 12/1974 | Helbing et al. | 56/327 A |
| 3,893,285 | 7/1975 | Seeley et al. | 56/327 A |
| 3,927,514 | 12/1975 | Sammet | 56/327 A |

*Primary Examiner*—Russell R. Kinsey
*Attorney, Agent, or Firm*—Mason, Fenwick & Lawrence

[57] ABSTRACT

A harvesting machine is disclosed which is especially adapted to harvesting asparagus; however, it is effective for a variety of objects such as apples, nuts or golf balls. The harvester, which may be pushed, pulled or self-propelled, includes a rigid outer frame supported on ground engaging support wheels which are positioned to travel adjacent the asparagus rows or the like. A rigid picking head frame is pivoted from the extreme rear of the outer frame so that rough ground will not cause extreme up and down movement of a picking head which is adjacent the forward end of the outer frame. Ground engaging drive wheels mounted on the picking head frame are also positioned to travel adjacent the asparagus rows or the like and provide a drive for the picking head which includes pairs of a parallel spaced apart flexible elastomeric discs having protrusions on the radial surfaces thereof. The flexible discs are fixed to a rotary shaft which is mounted perpendicular to the direction of travel of the harvester and parallel to the ground and is driven by the ground engaging drive wheels. The shaft and discs are driven by the ground engaging drive wheels at peripheral speeds other than the ground speed of the harvester. Wedge shaped elemens fixed to the picking head frame force adjacent flexible discs into contact with one another in a picking zone. A conveyor driven by a ground engaging wheel receives and elevates the asparagus which has been guided between adjacent discs and broken off as a result of the speed of the discs, the force of the wedges holding the discs together and the protrusions on the radial faces of the adjacent discs.

17 Claims, 13 Drawing Figures

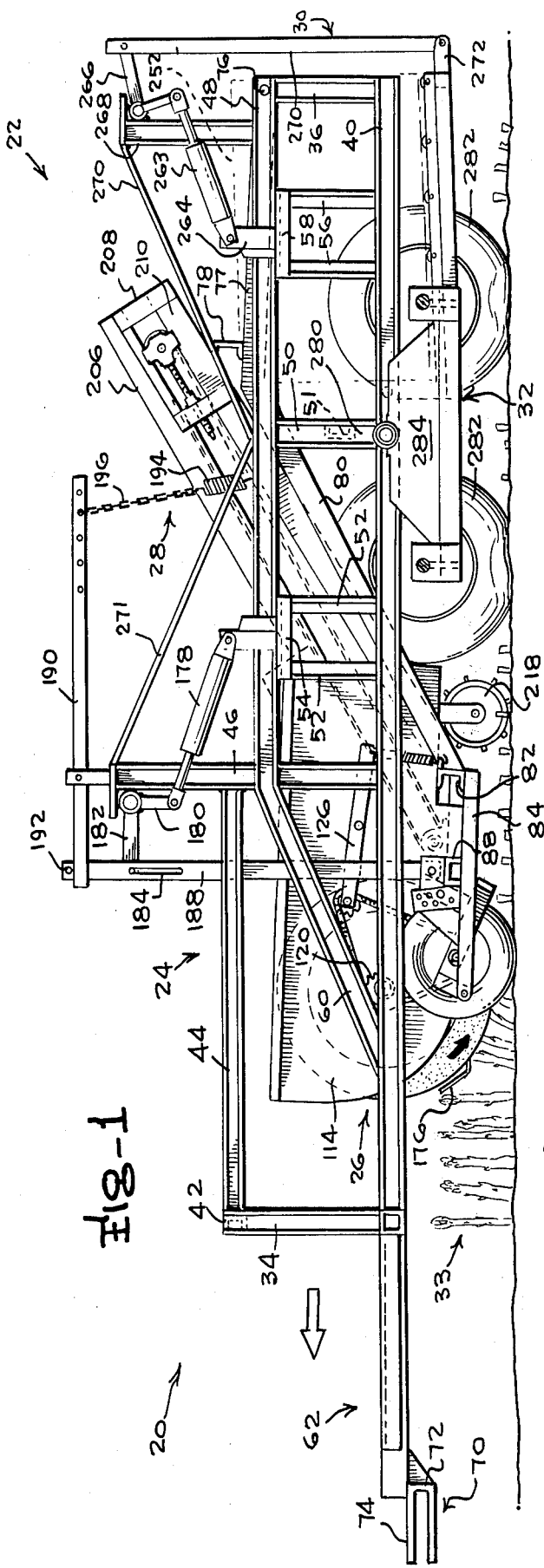
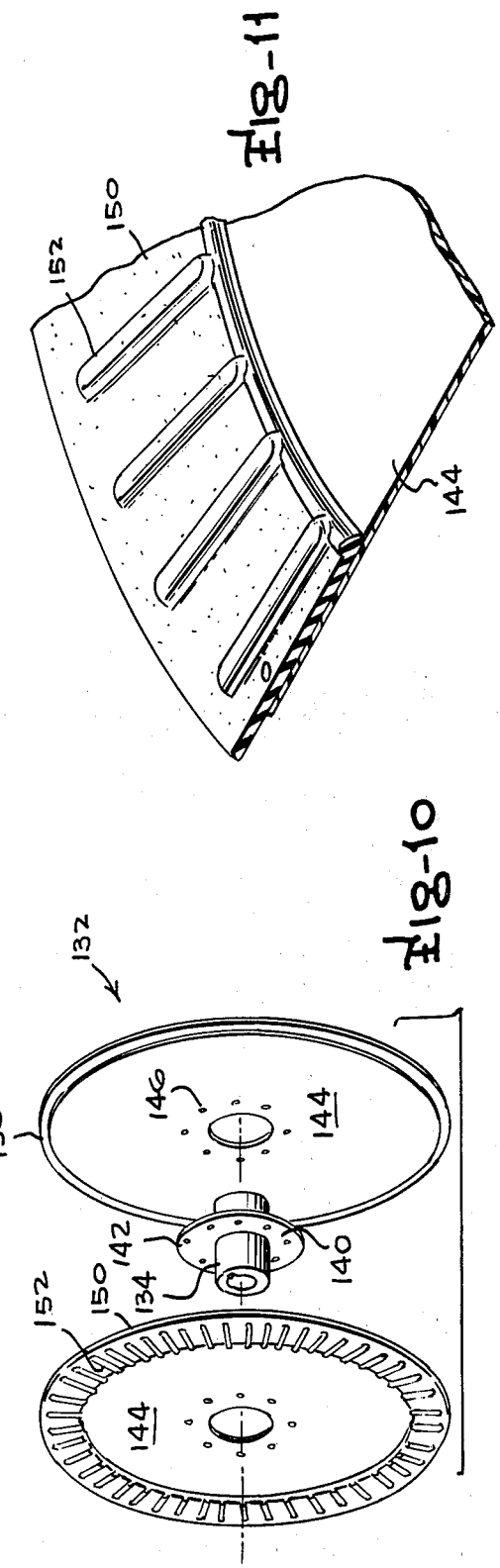

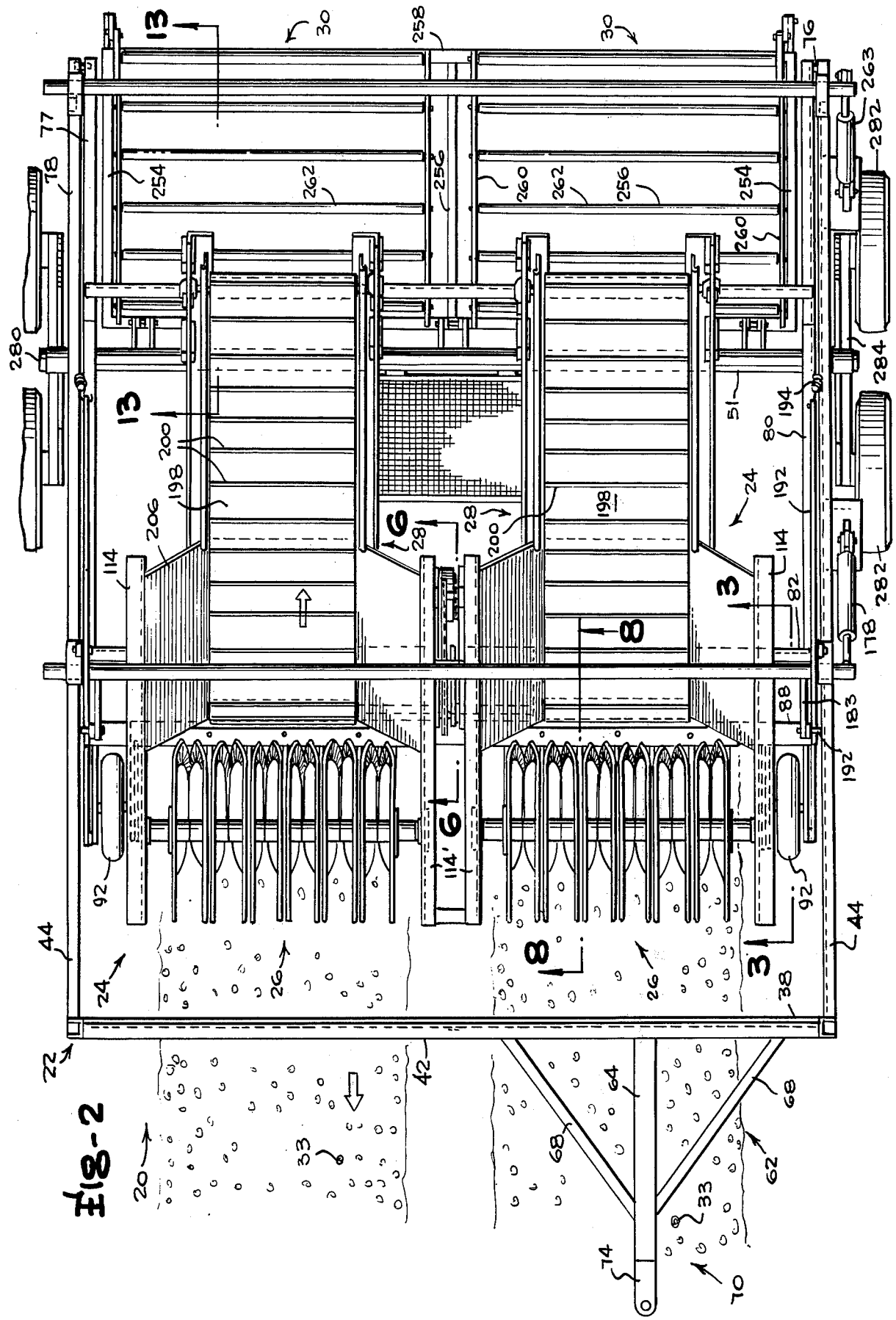

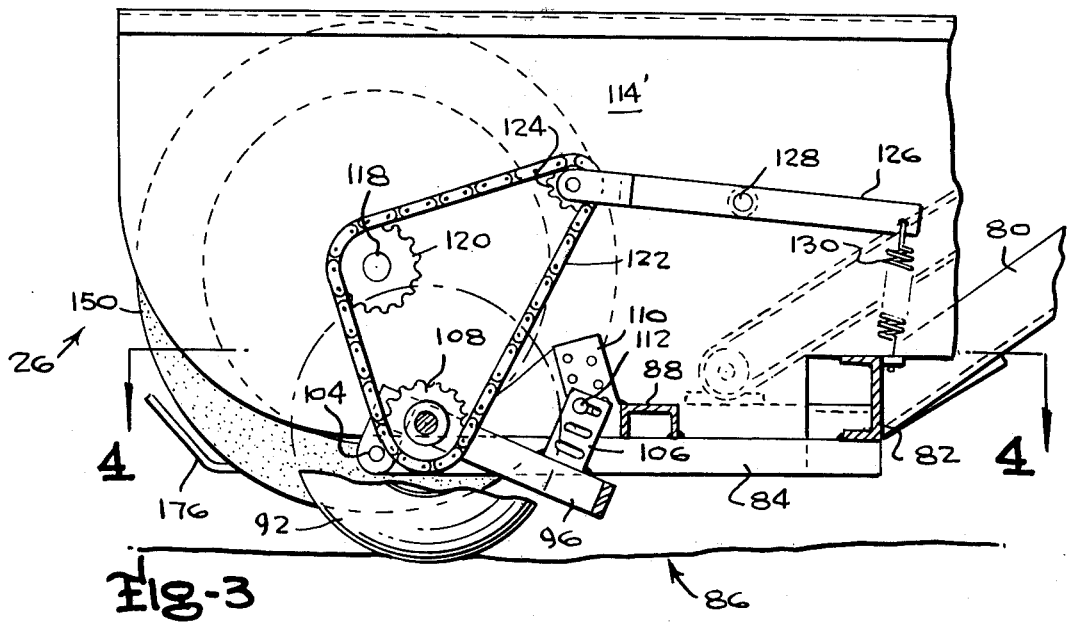
Fig-3
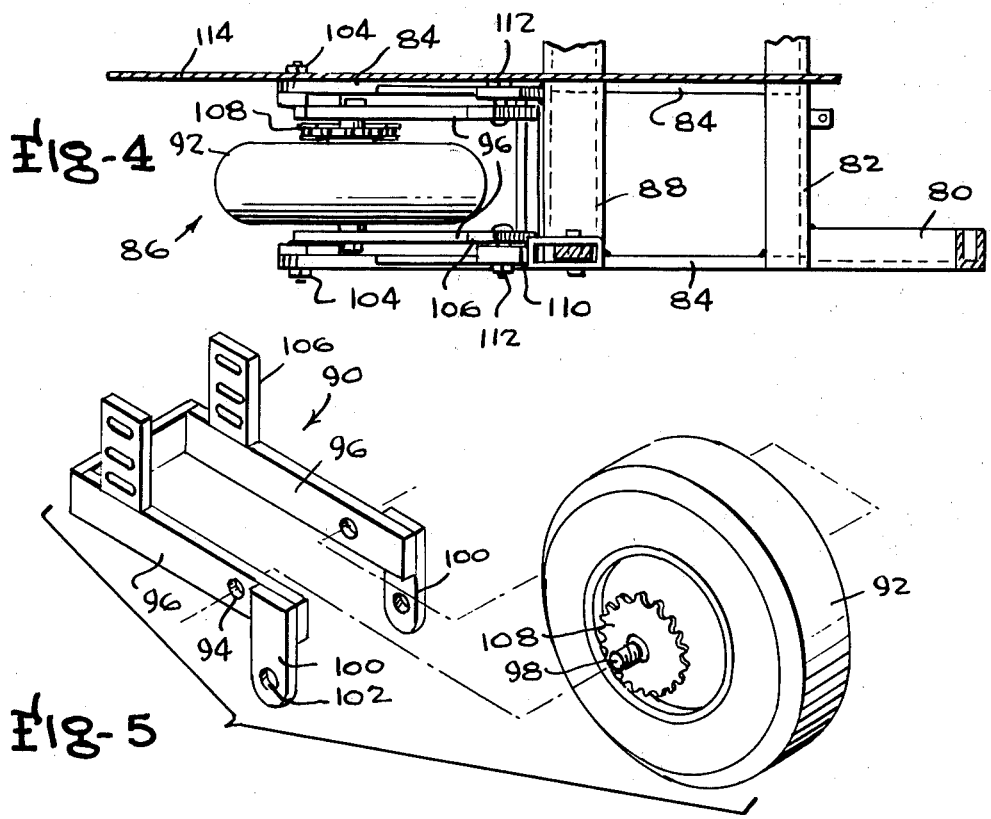
Fig-4
Fig-5

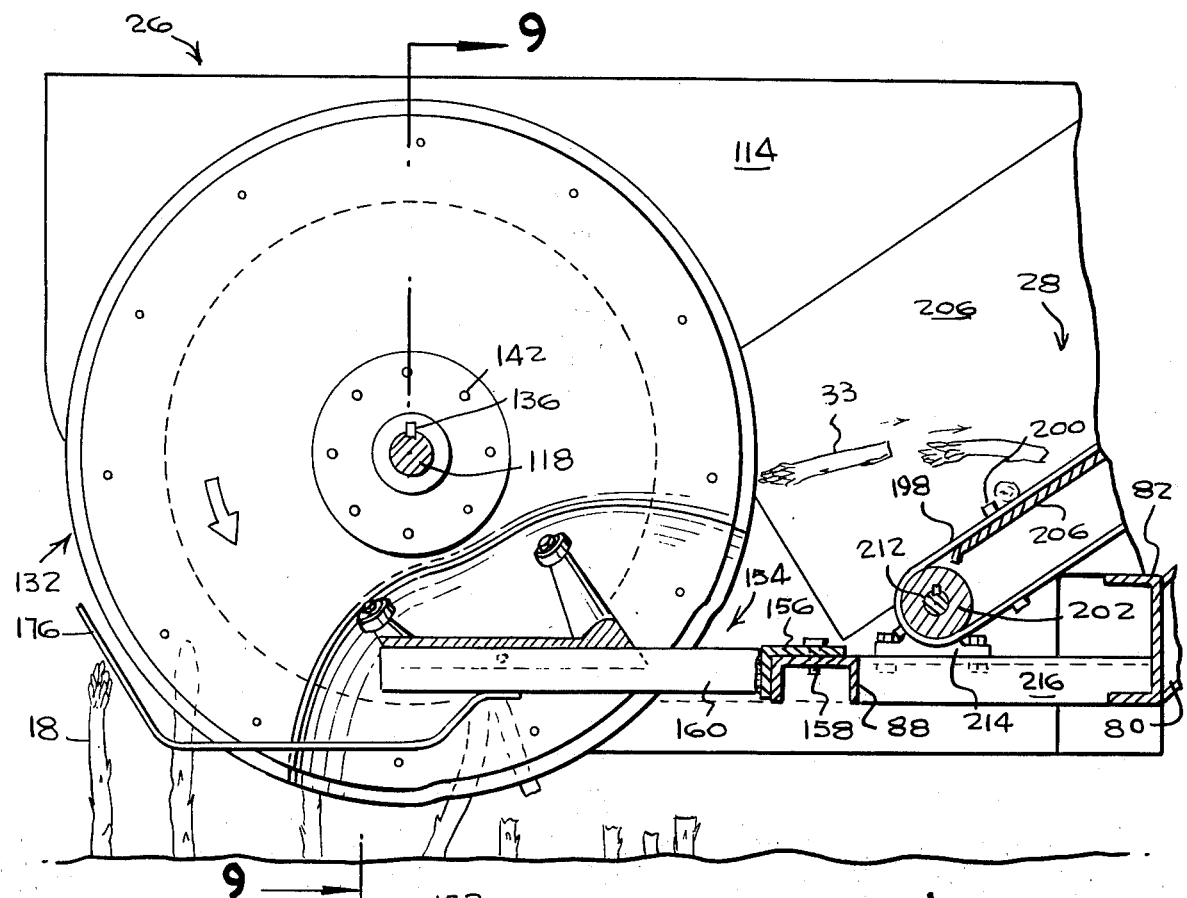
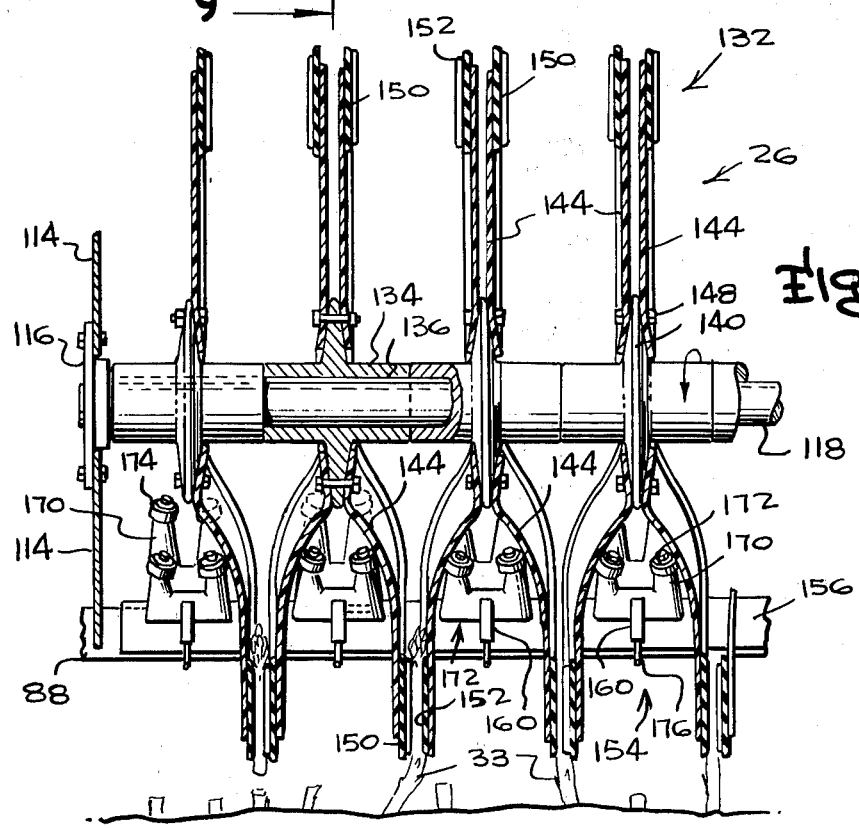
Fig-8
Fig-9

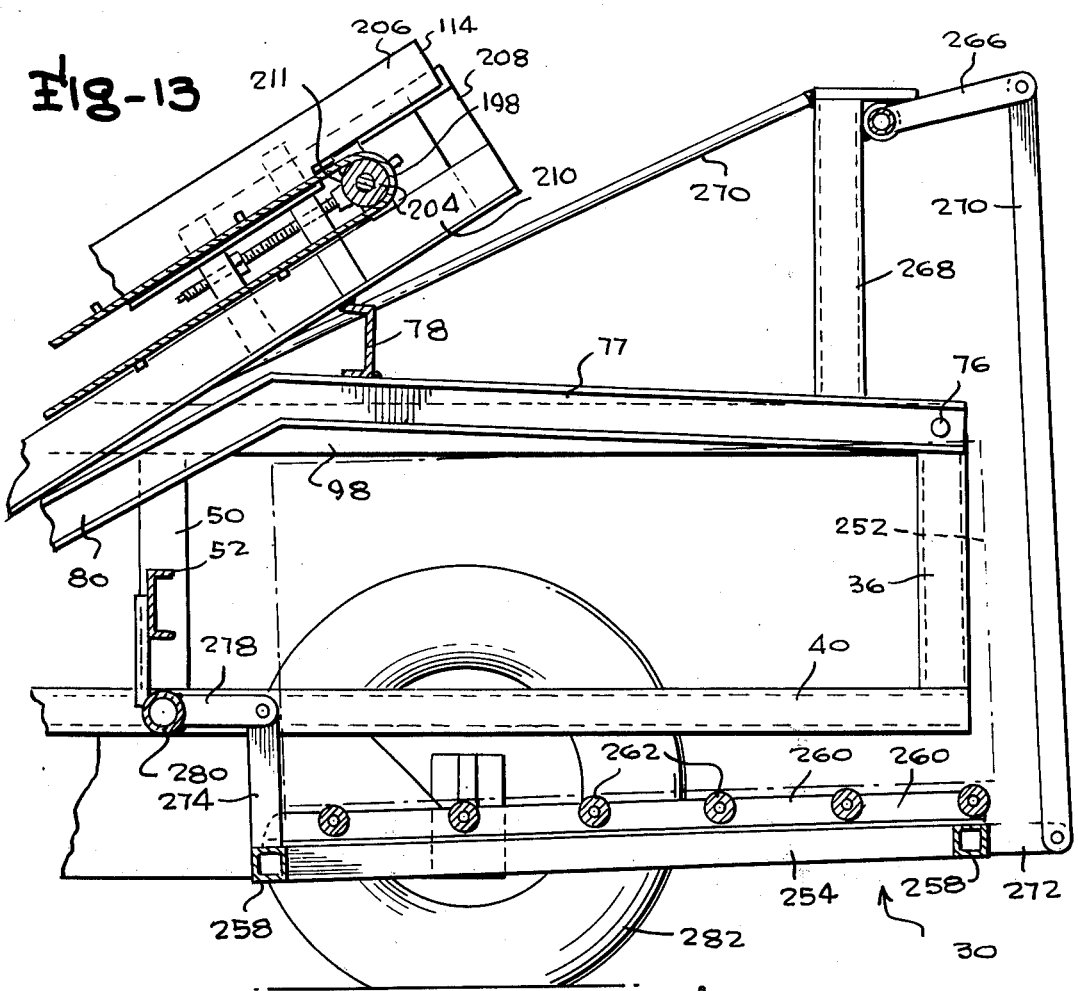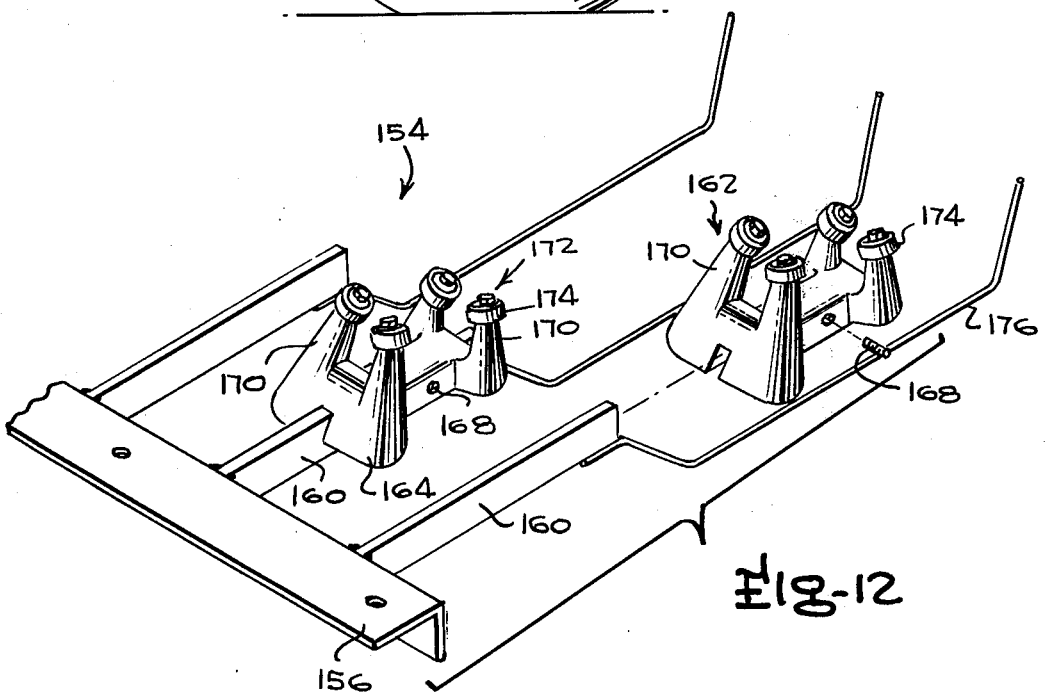

HARVESTER APPARATUS

This invention is in the field of harvesting machines and is specifically directed to the field of harvesting equipment for picking asparagus.

Prior known devices for mechanically picking asparagus have employed cutting devices which sever the stalks of asparagus close to or below ground level before the stalks are lifted from the ground. These devices indiscriminately cut the stalks a uniform distance from ground level thereby producing lower grade asparagus because stalks of undesirable pith containing the fiberous portion which can occur in the lower part of the stalk are mixed in with those stalks of the proper pith. The overall quality of the harvested asparagus is reduced since premium prices are paid for asparagus which is of the proper pith. These stalks do not contain any fibrous portion thereby producing a tender, juicy produce for which the consumer is willing to pay a premium price which in turn increases the potential financial return to the harvester. The hand labor of field hands can produce a premium harvest; however, hand labor is expensive and field hands are becoming increasingly more difficult to hire at the desired times.

Therefore, it is an object of the present invention to provide a new and improved harvesting machine.

Yet another object of the present invention is to provide a harvesting apparatus which selectively harvests asparagus of only the proper pith thereby increasing the quality of the produce being harvested.

A still further object of the present invention is to provide a mechanical harvesting apparatus which is much faster and less expensive than previous hand picking methods which were necessary to harvest premium quality asparagus.

Another object of the present invention is to provide a harvesting apparatus in which the picking machine rides very smoothly over the ground regardless of the position of support wheels on which the picking mechanism is mounted.

A further object of the present invention is to provide an asparagus harvesting apparatus which produces a better quality crop at less expense and with less destruction to the plants being harvested.

Obtainment of the objects of this invention is enabled through the provision of a harvester apparatus which may be pushed or pulled by a tractor or the like or may be self-propelled. The harvester includes a rigid outer frame supported on pairs of ground engaging support wheels whose axles are rigidly connected and rotate about an eccentric pivot on the outer frame. The support wheels are positioned to travel adjacent the asparagus rows. A rigid picking head frame is pivoted at its rear from the extreme rear of the outer frame so that rough ground will now cause extreme up and down movement of a picking head which is adjacent the forward end of the outer frame. Ground engaging drive wheels provide a drive for the picking head and are mounted on the picking head frame in position to travel adjacent the asparagus rows. The picking head includes pairs of parallel spaced apart flexible elastomeric discs having protrusions on the radial surfaces thereof. The flexible discs are fixed to a rotary shaft which is mounted perpendicular to the direction of travel of the harvester and parallel to the ground and is driven by the ground engaging drive wheels in the same direction as the drive wheels. The shaft and discs are driven by the ground engaging drive wheels at peripheral speeds other than of the ground speed of the harvester. Wedge shaped elements fixed to the picking head frame force adjacentflexible discs into contact with one another in a picking zone.

The asparagus is guided between adjacent discs and broken off as a result of the speed of the discs, the force of the wedges holding the discs together and the protrusions on the radial face of the discs. The asparagus is then dropped onto a conveyor, mounted on the outer frame and driven by a ground engaging wheel, after the asparagus rotates out of the picking zone.

A better understanding of the manner in which the preferred embodiment of the invention achieves the objects of the invention will be enabled when the following written description is read in conjunction with the appended drawings in which:

FIG. 1 is a side plan view of the preferred embodiment of the present invention;

FIG. 2 is a top plan view of the preferred embodiment of the present invention shown in FIG. 1;

FIG. 3 is an enlarged sectional view taken along lines 3—3 in FIG. 2;

FIG. 4 is a sectional view taken along lines 4—4 in FIG. 3;

FIG. 5 is an exploded perspective view of components of the assembly shown in FIGS. 3 and 4;

FIG. 8 is an enlarged sectional view taken along lines 8—8 in FIG. 2;

FIG. 9 is a partial sectional view taken along lines 9—9 in FIG. 8;

FIG. 10 is an exploded perspective view of the picking disc assembly of the preferred embodiment;

FIG. 11 is a fragmentary perspective view of the gripping disc and picking disc of the preferred embodiment;

FIG. 12 is an enlarged exploded perspective view of the wedge assembly of the preferred embodiment;

FIG. 13 is an enlarged sectional view taken along lines 13—13 in FIG. 2;

Figure 6:
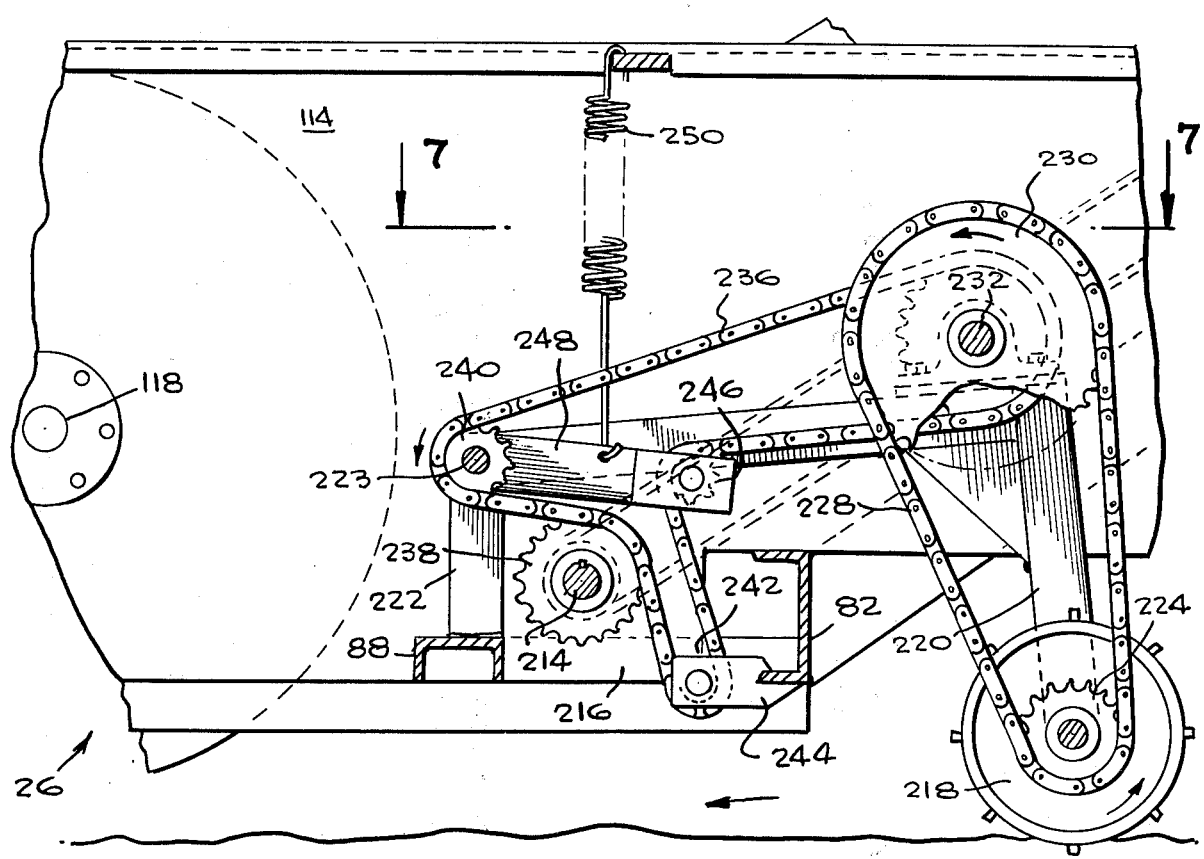
FIG. 6 is an enlarged sectional view taken along lines 6—6 in FIG. 2.

Attention is initially invited to FIGS. 1 and 2 of the drawings which illustrate the preferred embodiment of the invention, generally designated at 20, which includes an outer frame 22 which provides the main support structure for the apparatus, a picking head frame 24 which is pivotally mounted to the outer frame 22 and which supports the picking heads 26, conveyor belt assemblies 28, roller conveyors 30 and ground support wheel assemblies 32 mounted on the outer frame 22.

The harvester 20 is illustrated as it would appear in a field of asparagus in a picking position over two beds of asparagus stalks 33.

The primary support structure, as best shown in FIGS. 1 and 2, for the outer frame 22 is formed primarily with channel members of U-shaped cross section which are welded together to form a rigid outer frame. The outer frame 22 includes forward vertical corner posts 34 and rear vertical corner posts 36 which are secured to lower horizontal side frame members 40 connected at their forward ends by a lower horizontal end frame member 38. The upper ends of the vertical corner posts 34 support an upper horizontal end frame member 32 and forward upper horizontal side frame members 44 at the forward end of member 44 while the opposite end of member 44 is supported by a vertical support post 46 having its lower end fixed to the lower horizontal side frame member 40. The upper ends of the rear vertical corner posts 36 support a rear upper horizontal side frame member 48 at one end with the opposite end of the upper member 48 fixed to the vertical support post 46. Midway between the rear vertical corner post 36 and the support post 46 is a vertical reinforcing member 50 fixed to the rear upper horizontal side frame member 48 and the lower horizontal side frame member 40 to provide sufficient support for the ground support wheel assemblies 32. Extending horizontally between the vertical reinforcing members 50 is a horizontal reinforcing member 51 which is fixed to the vertical reinforcing members 50. Two vertical bracket support members 52 extend between the rear upper horizontal side frame member 48 and the lower horizontal side frame member 40 midway between the vertical support post 46 and the vertical reinforcing member 50 to provide support for an outwardly extending bracket plate 54 attached to the upper ends of the vertical bracket support members 52. Similarly, two vertical bracket support members 56 extend between the rear upper horizontal side frame member 42 and the lower horizontal side frame member 40 to provide support for a second horizontal bracket plate 58 which extends outwardly from the upper end of the second vertical reinforcing members 56. A diagonal reinforcing member 60 extends from the end of the rear upper horizontal side frame member 48 fixed to the vertical support post 46 downwardly and is fixed at its opposite end to a position central of the lower horizontal side frame member 40 extending between the vertical support post 46 and the forward vertical corner post 34.

A towing tongue assembly 62 is mounted to the front lower horizontal end frame member 38 eccentric of the center line of the apparatus to permit the wheels of a tractor or the like used to tow the apparatus to be positioned with its wheels on opposite sides of the rows of asparagus being picked. The tongue assembly 62 includes a main tongue member 64 which extends horizontally from the front lower horizontal end frame member 38 and is fixed thereto with side struts 68 extending from a forward portion of the main tongue member 64 diagonally back to frame member 38. A tractor hitch 70 is attached to the forward end of the main tongue member 64 and includes a forwardly opening U-shaped member 72 having vertical holes 74 to receive a retaining pin when the harvester is connected to a tractor or the like.

Picking head pivot pins 76 are mounted in the rear upper horizontal side frame members 48 above the rear vertical corner posts 36 and about which the entire picking head frame 24 pivots. Rear picking head frame members 77 receive pivot pins 76 in one end, as best shown in FIG. 2, and are connected by a horizontal transverse reinforcing member 78. Diagonal picking head support members 80 are attached to the forward end of the frame members 77 and extend downwardly toward the front of the picking head frame 24, and are connected at their opposite ends to a horizontal conveyor support member 82 which extends transversely between the diagonal picking support members 80. Two longitudinal spaced nsversely across the picking head and is fixed to the top edges of the wheel support members 84.

The ground engaging drive wheel assembly 86, which provide the drive to operate the picking heads 26, includes a U-shaped wheel support bracket 90 which extends around the picking head drive wheel 92 as best shown in FIG. 5 and has wheel mounting holes 94 extending through the ends of legs 96 of the U-shaped bracket 90 to receive the wheel axle 98. Extending downwardly from the outer ends of the leg 96 are support tabs 100 having wheel pivot holes 102 at the lower end thereof to receive wheel pivot mounting bolts 104 which pass through the ends of the wheel support members 84 to provide an eccentric pivot for the wheel 92 as shown in FIGS. 3 and 4. Adjacent the connected ends of the legs 96 of the U-shaped bracket are upwardly extending slotted plates 106 with the slots extending parallel to the legs 96. A driving sprocket gear 108 is fixed to the side of picking head drive wheel 92.

Attached to the outer front edges of the channel support member 88 are a pair of vertical perforated plates 110 to receive positioning bolts 112 which pass through the slots in slotted plates 106 and through a hole in the vertical perforated plates 110 to provide adjustable positioning of the picking head drive wheels 92.

The picking heads 26 are supported by an outer pair of picking head end plates 114 and an inner pair of picking head end plates 114', as shown in various figures. The end plates are attached to the channel support member 88 and the horizontal conveyor support member 82 for the inner pair of picking head end plates 114' and additionally to the wheel support members 84 for the outer pair of the picking head end plates 114. Mounted on the picking head end plates 114 and 114' are picking heads rotary bearings 116 which are of conventional configuration and support a rotary picking head drive shaft 118. The drive shaft extends beyond outer end plates 114 and has a driven gear sprocket 120 fixed to the ends thereof as shown in FIG. 3 which is operatively connected to the driving sprocket gear 108 by a picking head chain 122. Tensioning of the chain 122 is provided by passing the chain over a picking head idler gear 124 which is mounted at the end of a idler gear support link 126 mounted centrally of its length on a pivot 128 fixed to the picking head end plate 114. A biasing spring 130 connects the free end of the support link 126 to the horizontal conveyor support member 82 as best shown in FIG. 3.

The elements, which actually perform the picking function, include picking disc assemblies 132, as shown in FIGS. 9 and 10. These assemblies include picking disc hubs 134 which are splined to the rotary picking head drive shaft 118 by a spline 136, as shown in FIGS. 8 and 9. The disc assemblies are rotated as the picking head drive wheels are rotated against the ground. The center of the hub has a flange portion 140 with opposed conical surfaces and disc mounting holes 142 passing through the flange. Mounted to the two conical faces are discs 144 having mounting holes 146 which align with the disc mounting holes 142 in the hub 140 to receive clamping bolts 148 as best shown in FIG. 9. The disc 144 may be formed of a relatively flexible plastic material such as polypropylene and is sufficiently thin to be flexed as shown in the bottom portion of FIG. 9 without failing. Riveted to the outer portion of the disc 144 are the gripping discs 150 formed of a resilient elastomeric material such as urethane. Radial protrusions 152 extend axially from the surface of the gripping disc and are spaced apart circumferentially around the discs to assist in breaking the asparagus at the point of proper pith.

The flexing together of the lower portion of the picking head disc assemblies 132 is accomplished by the wedge assembly 154 as best shown in FIGS. 8, 9 and 12 which includes a wedge mounting bracket 156 which has mounting holes therein to permit mounting by wedge bolts 158 to the channel support member 88 as shown in FIG. 8. Extending forward from the wedge mounting bracket 156 are wedge support bars 160 to which are clamped wedge rabbits 162 having a slotted body 164 which fits over the channel support bar and is held at the desired position on the bar by a set screw 168 as best shown in FIG. 12 and includes two pairs of upwardly and inwardly projecting legs which carry roller bearing 172 having outer races 174 mounted on the ends of the legs to provide a frictionless wedging action to force the adjacent discs 144 together as shown in FIGS. 8 and 9 to form a picking zone where the asparagus may be grasped and broken at the height of proper pith. Fixed to the outer end of the wedge support bars 160 are wire fingers 176 which prevent asparagus from entering the space between the discs on each picking disc hub 134 in which case the asparagus stalks 33 would miss the picking action of the gripping discs 150.

The picking head 26 may be lifted to a non-picking position by actuation of head lifting hydraulic cylinder 178 which is connected to one leg 180 of a head lifting bell crank which is pivoted to the upper end of the vertical support post 46. The second leg 182 of the bell crank has a pin extending therefrom which slides in a slot 184 in a lifting link 188. The lower end of the lifting link 188 is pivotally connected to the channel support member 88, as best shown in FIG. 1. The opposite end of the lifter link is biased upwardly by a biasing link 190 which is pivoted at the center of the biasing link to the vertical support post 46. One end of the biasing link passes under a biasing pin 192 extending horizontally outwardly from the lifting link 188. Counter balancing of the picking head is provided by a lifter biasing spring 194 connected at one end to the rear upper horizontal side frame member 48 and connected at the opposite end by a chain 196 to the end of the biasing link 190 opposite the end supporting the lifting link 188. Suitable connections are provided for varying the length of the chain 196 thereby permitting an adjustment of the weight carried by the picking head drive wheels 92 thereby preventing the drive wheels from being buried in sand or dropping into ruts.

The asparagus stalks 33 as shown in FIG. 8 are received by the conveyor belt assemblies 28 which includes a conventional conveyor belt 198 having lateral ribs 200 and travel around drive roller 202 as shown in FIG. 9 and around idler roller 204 as shown in FIG. 13. Conventional guide plates 206 which form an integral portion of the conveyor belt assembly insure that all of the produce picked by the picking heads lands on the conveyor belts 198. The guide plates 206 are fixed to the picking head end plates 114 and are supported at their upper ends by conveyor end member 208, as shown in FIG. 13. The conveyor end members 208 is connected at its lower end to a conveyor angle member 210 which extends under both sides of the conveyor and is welded to the horizontal reinforcing member 78 as shown in FIG. 13 and to the horizontal conveyor support member 82.

Figure 7:
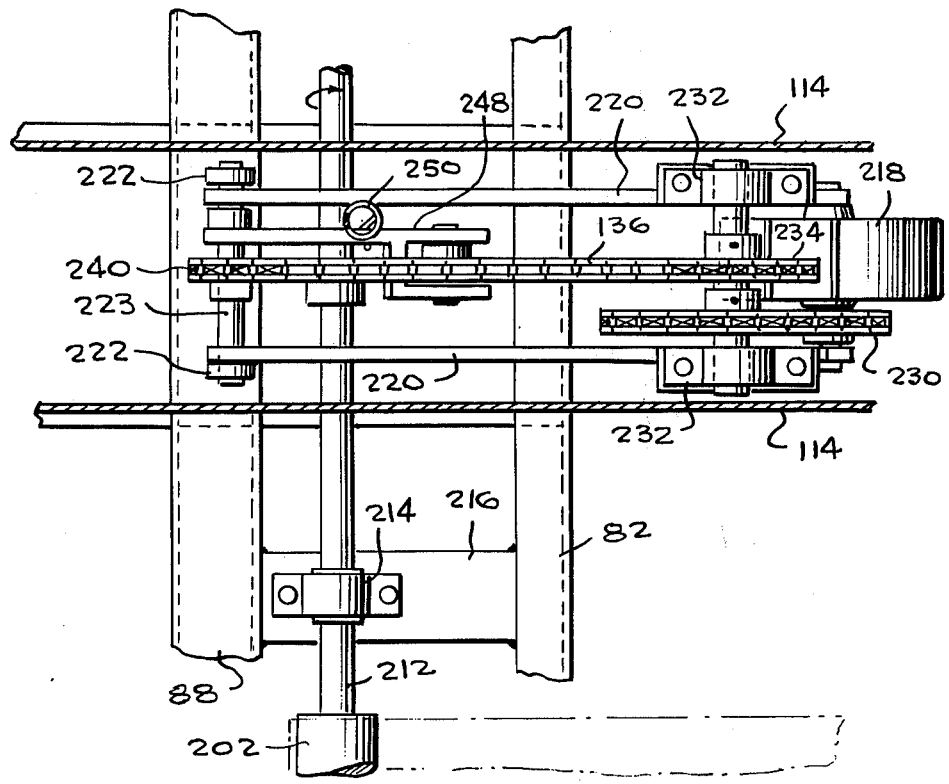
FIG. 7 is a sectional view taken along lines 7—7 in FIG. 6.

Conventional belt tensioning mechanism 211 as shown in FIGS. 1 and 13 is mounted on the conveyor idler roller 204 to place the conveyor belt under proper tension. The conveyor drive roller 202 is splined to the conveyor drive shaft 212 which is supported on conventional roller bearings 214 as shown in FIG. 7. The roller bearings are mounted on cross support members 216 fixed at their ends to the horizontal conveyor support member 82 and a wedge support member 88 as shown in FIGS. 7 and 8.

The conveyor belt assemblies are driven by a cleated drive wheel 218 which rotates about one end of an L-shaped conveyor drive wheel support frame 220. The end of the opposite leg of the support frame is pivoted to a support shaft mounted between conveyor support bars 222 extending upwardly from the center of the wedge support member 88. A conveyor drive wheel sprocket gear 224 fixed to the cleated drive wheel 218 is connected by a conveyor chain belt 228 to a large intermediate idler gear 230 which is fixed to an idler shaft 223. Idler bearings 232 mounted on the conveyor drive wheel support frame rotatably support the idler shaft 223. Power from the large intermediate idler gear 230 is transmitted through a small intermediate idler gear 234 fixed to the idler shaft 223 by an intermediate idler gear chain 236 to a conveyor drive gear sprocket 238 splined to the conveyor drive shaft 212 as shown in FIG. 6. The intermediate chain 236 passes from the small intermediate idler gear 234 around a first conveyor idler gear 240 which rotates around the support shaft 223. The intermediate chain 236 then passes around the conveyor drive gear sprocket 238 to a second conveyor idler gear 242 pivotally supported on second conveyor idler gear bracket 244 mounted to the horizontal conveyor support member 82. The chain 236 then passes around a third conveyor idler gear 246 which is rotatably supported on a third conveyor idler gear link 248 which is pivoted at the opposite end about support shaft 223. The third conveyor idler gear is biased upwardly against the chain 236 by a biasing spring 250 which is connected at its upper end to the picking head end plate 114.

When the asparagus is conveyed off the end of the conveyor belt 198, it drops into a box 252 shown in dotted lines in FIGS. 1 and 13 which is supported on the roller conveyor assembly 30. The main structure of the roller conveyor assembly includes outer longitudinal support members 254 and an inner longitudinal support member 256 fixed to transverse support members 258 at the front and rear of the roller conveyor assembly as best shown in FIGS. 2 and 13. Roller support members 260 extend between the transverse support members 258 intermediate the side and center support rails 254 and 256 and are interconnected by a spaced set of rollers 262. The rollers conveyor assembly 30 is supported at the rear by a conveyor hydraulic cylinder 263 connected at one end to a second horizontal bracket plate 58 through a connecting bracket 264. The opposite end of the conveyor hydraulic cylinder 263, as shown in FIGS. 1 and 2, is connected to one leg of a bell crank 266 pivoted on a support member 268 which is fastened to the rear upper side support member 48. The support member 268 is reinforced by a strut 270 connected to the upper end of the support member 268 on one end and to the rear upper side support member 48 above the vertical reinforcing member 50. A similar strut 271 reinforces the vertical support post 46. The free end of the second leg of the bell crank 266 is pivotally connected to a roller conveyor lift link 270. The opposite end of the lift link 270 is pivoted to a lift bracket 272 fixed to the rear transverse support member 258 of the roller conveyor as shown in FIG. 13. The forward end of the roller conveyor assembly is supported by connecting brackets 274 fixed at one end to the forward transverse support member 258 and pivoted at their upper ends to arms 278 fixed to a support wheel shaft 280 which projects beyond the lower horizontal side frame members 40.

The harvester is supported on ground support wheels 282 which are rotatably mounted on ground support wheel frames 284 with their axes of rotation equi-distant from a main support bearing 286 on the ground support wheel frame 284. The main support bearings 286 are retained on the portions of the support wheel shaft 280 which extend beyond the lower horizontal side frame members 40.

Operation of the harvesting apparatus is accomplished by connecting the tractor hitch 70 to a tractor with one wheel of the tractor between the two rows of asparagus generally shown in FIG. 2 and with the second wheel outside the lower row of asparagus thereby avoiding any damage to the asparagus bed. The height of the picking head 26 is adjusted by selecting the appropriate slots in the slotted plate 106 on the ground engaging wheel assemblies 86 with the desired hole on the vertical perforated plate 110. Both picking heads would normally be adjusted to the same height depending on the picking conditions.

The head lifting hydraulic cylinder 178 would be retracted to drop the lifting link 188 to bring the picking head drive wheel 92 into contact with the ground on the outside of the asparagus row. An empty box 252, as shown in FIGS. 1 and 13, would be placed in a forward position on the roller conveyor assembly to receive the picked asparagus. The hydraulic cylinder 263 would be extended to cause the roller conveyor lift link 270 to lift the lift bracket 272 thereby inclining the roller assembly toward the front of the apparatus and prevent the box 252 from rolling out of the apparatus. As can best be seen in FIGS. 1 and 2, as is larger than the diameter of the picking head drive wheel 92 and the driving sprocket gear 108 and the driving gear sprocket 120 of equal diameter. The picking discs 144 may be operated at peripheral speeds less than the ground speed of the apparatus.

As the harvester moves forward, the asparagus stalks pass into the picking head between the picking discs as best shown in FIG. 2 and as the harvester moves forward, the asparagus stalks move into the picking zone as shown in FIGS. 1, 8 and 9 where the radial protrusions 152 on gripping discs 150 are wedged into positions adjacent one another by the wedge assembly 154 with the outer race 174 of the roller bearing 172 rolling against the picking disc 144 to cause it to deflect outwardly thereby bringing the gripping discs into close proximity. With the discs rotating at peripheral speeds other than the ground speed of the vehicle, the radial protrusions 152 will cause the asparagus to break at the point of desired pith as the tougher lower portions of the asparagus will cause the picking discs 144 to flex away from the asparagus since the discs 144 are formed of a flexible material. This action causes the asparagus stalk to break at the point of proper pith thereby leaving the tougher portion on the stalk remaining in the field and gripping the tender premium portion of the stalk.

As the picking head continues to rotate through the picking zone, the picked asparagus stalk will be held between the adjacent gripping discs 150. However, after passing the picking zone which is beyond the wedge assembly 154, the picking discs 144 will separate and centrifugal force caused by the rotation of the picking discs will cause the picked asparagus stalks 33, as shown in FIG. 8, to be dropped onto the conveyor belt 198. The cleated drive wheel 218 drives the conveyor through conveyor chain belt 228, the large intermediate idler gear 230, the small intermediate idler gear 234 and the intermediate chain belt 236 which drives the conveyor drive gear sprocket 238 fixed to the conveyor drive shaft 212. The third conveyor idler gear 246 with biasing spring 250 keep the intermediate chain belt 236 under constant tension regardless of the position of the cleated drive wheel 218. The drive wheel is free to pivot about idler shaft 223 to maintain positive traction regardless of the condition of the field in which the asparagus is being harvested.

When the asparagus stalks reach the top of the conveyor, it falls by gravity into the box 252 to be accumulated. When the box is filled, the lift hydraulic cylinder 263 may be deactivated to incline the rollers 260 toward the rear of the apparatus thereby permitting the box 252 to roll out of the harvester onto the ground. With the pairs of ground support wheels 282 pivoted about an eccentric axis, the picking head is less subject to changes in height above the asparagus bed as the configuration of the support wheel tends to average out any dips or rises in the ground over which it travels. Since the outer frame of the harvester is relatively rigid and the picking head frame is pivoted at the extreme rear of the outer frame and is counterbalanced by lifter biasing spring 194, the picking heads will remain relatively parallel to the outer frame when one of the picking head drive wheels 92 drops into a rut or depression as it travels along the asparagus bed thereby preventing the picking discs from coming into contact with the ground and damaging the asparagus roots or the picking head.

While the present invention has been shown in the preferred embodiment as an asparagus harvester, it may be effectively used for gathering apples, golf balls or the like by lowering the picking heads.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A harvesting apparatus adapted for traveling along an asparagus bed and picking asparagus stalks, said apparatus comprising a support frame, ground engaging means mounted to the frame for maintaining the support frame at a predetermined distance above the ground, and picking means mounted on the support frame for grasping only the stalks of a predetermined first height above the ground and bending the stalks of the asparagus to break the stalks at a second height above the ground which is less than the predetermined first height and at which the stalk is of a predetermined desired pith, said picking means including a rotary driven shaft mounted on the support frame perpendicular to the direction of travel of the harvesting apparatus and parallel to the ground, pairs of parallel flexible discs fixed to the rotary shaft and having protrusions on at least one of the radial surfaces of each disc, spacing means for bringing pairs of adjacent discs into close proximity during rotation of the discs through a picking zone, means for separating the discs after the discs rotate out of the picking zone and drive means for rotating the discs at peripheral speeds other than the ground speed of the harvesting apparatus and at sufficient relative velocity between the periphery of the disc and the ground to bend and break the asparagus stalks thereby permitting asparagus or the like guided into the picking zone to be grasped, bent and broken by the adjacent discs and then to be removed as the discs separate to produce a macimum yield of premium grade asparagus by picking only asparagus of the proper pith at a second height lower than a predetermined first height to which the asparagus must grow before being harvested.

2. The harvesting apparatus of claim 1 wherein the discs in each pair of discs on the roary shaft are spaced apart and wherein the spacing means includes a wedge means fixed to the support frame for forcing adjacent flexible discs into contact with one another in the picking zone.

3. The harvesting apparatus of claim 2 wherein the discs are formed of an elastomeric material and wherein the drive means includes a ground engaging drive wheel and means for driving the rotary drive shaft with the drive wheel to rotate the rotary drive shaft as the harvesting apparatus travels over the ground.

4. The harvesting apparatus of claim 3 wherein the driving means includes a driven gear fixed to the rotary shaft, a driving gear fixed to the ground engaging drive wheel, and a drive chain operatively engaging the two gears.

5. A harvesting apparatus adapted for traveling along an apparagus bed and picking asparagus stalks, said apparatus comprising a support frame, ground engaging means mounted to the frame for maintaining the support frame at a predetermined distance above the ground, and picking means mounted on the support frame for grasping only the stalks of a predetermined first height above the ground and bending the stalks of the asparagus to break the stalks at a second height above the ground which is less than the predetermined first height and at which the stalk is of a predetermined desired pith, said support frame including an outer frame and a picking head frame pivoted to the outer frame with the picking means mounted on the picking head frame, said ground engaging means includes ground engaging support wheels mounted on the outer frame and said ground engaging support wheels are mounted in pairs on opposite sides of the outer frame with the axles of each pair of wheels connected and rotatable about an eccentric pivot on the frame.

6. The harvesting apparatus of claim 1 wherein the support frame comprises an outer frame and a picking head frame pivoted to the outer frame with the picking means mounted on the picking head frame and wherein the ground engaging means comprises ground engaging support wheels mounted on the outer frame.

7. The harvesting apparatus of claim 2 wherein the support frame comprises an outer frame and a picking head frame pivoted to the outer frame with the picking means mounted on the picking head frame and wherein the ground engaging means comprises ground engaging support wheels mounted on the outer frame.

8. A harvesting apparatus adapted for traveling along an asparagus bed and picking asparagus stalks, said apparatus comprising a support frame, ground engaging means mounted to the frame for maintaining the support frame at a predetermined distance above the ground, and picking means mounted on support frame for grasping only the stalks of a predetermined first height above the ground and bending the stalks of the asparagus to break the stalks at a second height above the ground which is less than the predetermined first height and at which the stalk is of a predetermined desired pith, said support frame including an outer frame having a forward end and a rear end and a picking head frame pivoted at one end from the rear of the outer frame with the picking means mounted on the opposite end of the picking head frame, said picking means including a rotary driven shaft mounted on the picking head frame perpendicular to the direction of travel of the harvesting apparatus and parallel to the ground, pairs of parallel flexible discs fixed to the rotary shaft and having protrusions on at least one of the radial surfaces of each disc, spacing means for bringing pairs of adjacent discs into close proximity during operation of the discs through a picking zone, means for separating the discs after the discs rotate out of the picking zone thereby permitting asparagus or the like guided into the picking zone to be grasped, bent and broken by the adjacent discs and then to be removed as the discs separate and a drive means for rotating the discs at peripheral speeds other than the ground speed of the harvesting apparatus and at sufficient relative velocity between the periphery of the disc and the ground to bend and break the asparagus stalks thereby producing a maximum yield of premium grade asparagus by picking only asparagus of the proper pith at a second height lower than a predetermined first height to which the asparagus must grow before being harvested.

9. The harvesting apparatus of claim 8 wherein the discs in each pair of discs on the rotary shaft are spaced apart and wherein the spacing means includes a wedge fixed to the picking head frame for forcing adjacent flexible discs into contact with one another in the picking zone.

10. The harvesting apparatus of claim 9 wherein the ground engaging means comprises ground engaging support wheels mounted in pairs on opposite sides of the outer frame with the axles of each pair of wheels connected to each other and rotatable about an eccentric pivot on the outer frame.

11. The harvesting apparatus of claim 9 wherein the discs are formed of an elastomeric material and wherein the drive means includes a ground engaging drive wheel which is operatively connected to the rotary driven shaft to rotate the rotary driven shaft as the harvesting apparatus travels over the ground.

12. The harvesting apparatus of claim 11 wherein the drive means additionally includes a driven gear sprocket fixed to the rotary shaft, a driving gear sprocket fixed to the ground engaging drive wheel, and a drive chain operatively engaging the two sprockets.

13. The harvesting apparatus of claim 12 additionally including a conveyor belt mounted on the picking head frame adjacent the flexible discs to receive the picked asparagus after the asparagus passes through the picking zone and is thrown from the discs by centrifugal force.

14. The harvesting apparatus of claim 13 wherein the means for driving the conveyor belt includes a ground engaging wheel mounted on the picking head frame and operatively connected to the conveyor belt to drive the conveyor belt at predetermined speeds relative to the movement of the harvesting apparatus.

15. The harvesting apparatus of claim 14 additionally including a lifting means operatively connected to the support frame for raising the picking head end of the picking head frame to prevent damage to the picking head when the picking head frame is not in use and including a spring biasing means for reducing the forces on the ground engaging drive wheel when the wheel moves downwardly away from the picking head frame.

16. The harvesting apparatus of claim 15 additionally including a box for receiving asparagus stalks, a roller conveyor mounted on the outer frame with a portion of the roller conveyor positioned under an elevated end of the conveyor belt to hold the box which receives the asparagus stalks from the conveyor belt and includes a means for inclining the roller conveyor toward the rear of the outer frame thereby permitting the box to roll off the roller.

17. The harvesting apparatus of claim 1 wherein the support frame comprises an outer frame, a picking head frame operatively connected to the outer frame with the picking means mounted on the picking head frame and a means for moving the picking means generally parallel to the support frame and wherein the ground engaging means comprises ground engaging support wheels mounted on the outer frame.

* * * * *